United States Patent [19]

Verhagen

[11] Patent Number: 4,707,821
[45] Date of Patent: Nov. 17, 1987

[54] DISC HOLDER FOR A RIGID AUDIO AND/OR VIDEO DISC

[75] Inventor: Johannes P. C. M. Verhagen, Eindhoven, Netherlands

[73] Assignee: U.S. Philips Corporation, New York, N.Y.

[21] Appl. No.: 623,046

[22] Filed: Jun. 21, 1984

[30] Foreign Application Priority Data

Nov. 8, 1983 [NL] Netherlands ............... 8303837

[51] Int. Cl.⁴ .................. B65D 85/02; G11B 23/02
[52] U.S. Cl. ................................. 369/292; 206/309; 369/77.2; 369/291
[58] Field of Search .............. 369/75.2, 77.1, 77.2, 369/289, 291, 292; 206/309, 312, 444

[56] References Cited

U.S. PATENT DOCUMENTS

| 2,959,417 | 11/1960 | Vanderzee et al. | 369/37 |
| 4,159,827 | 7/1979 | Torrington | 369/77.2 |
| 4,433,410 | 2/1984 | Siryj | 369/77.2 |
| 4,463,850 | 8/1984 | Gorog | 206/309 |
| 4,509,158 | 4/1985 | Kang | 369/77.2 |
| 4,617,655 | 10/1986 | Aldenhoven | 206/444 |

FOREIGN PATENT DOCUMENTS 185061 10/1983 Japan ................... 369/75.2

Primary Examiner—Steven L. Stephan
Attorney, Agent, or Firm—F. Brice Faller

[57] ABSTRACT

A disc holder (17; 139) for transferring a rigid disc (15) to a turntable (6) of a disc-record player by means of a loading device (14). The disc holder (17; 139) comprises clamping means constituted by at least two clamping members (26; 148) which are situated near two opposite sides of the disc holder and which are each connected to a coupling member (83; 146) which can be coupled to the loading device (14). The coupling members (83; 146) and clamping members (26; 148) can be moved away from each other to release the disc (15) from the disc holder (17; 139) and toward each other to retain the disc.

22 Claims, 23 Drawing Figures

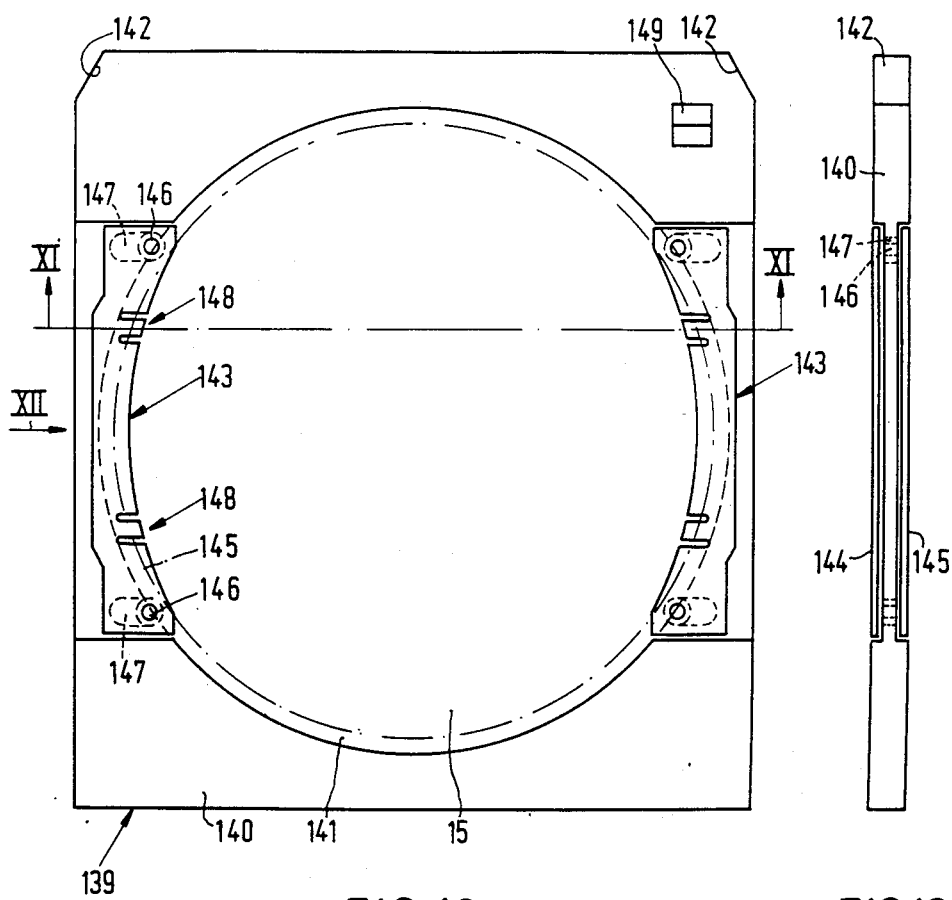

DISC HOLDER FOR A RIGID AUDIO AND/OR VIDEO DISC

BACKGROUND OF THE INVENTION

The invention relates to a disc holder for a rigid audio and/or video disc, which holder is intended for transferring the disc to the turntable of a disc-record player by means of a loading device and which comprises clamping means for retaining the disc in the disc holder.

Such a disc holder has been proposed in the applicants non-prepublished Netherlands Patent Application No. 8302130, to which U.S. application Ser. No. 808,664 corresponds, and comprises clamping means constituted by three disc clamps which are regularly spaced about the circumference of the disc. These disc clamps are radially movable relative to the centre of the disc. Due to this arrangement insertion of a disc into this disc holder must be effected very carefully in order to ensure that all the three disc clamps are moved outwards at the same time. Moreover, the clearance between the disc and the disc holder after the outward movement of the disc clamps is comparatively small. This may complicate the insertion of the disc into the disc holder and may also result in the disc, situated on the turntable, fouling the disc holder when the disc record player is subjected to shocks.

SUMMARY OF THE INVENTION

It is the object of the invention to construct a disc holder of the specified type in such a manner that it is easy to clamp a disc, and to release it from the disc holder.

To this end the clamping means comprise at least two clamping members which are situated near two opposite sides of the disc holder and which are each connected to a respective coupling means which can be coupled to the loading device, which coupling means and clamping members are both moved away from the disc and each other to release the disc from the disc holder and towards each other to retain the disc in said holder.

This results in a disc holder of which both clamping members effectively retain the disc. In addition to this effective clamping action the clamping members can easily be arranged at some distance from the disc so as to provide adequate radial clearance for the disc, for example during playing of a disc situated on the turntable.

A preferred embodiment of a disc holder is characterized in that the two clamping members are disposed diametrally opposite one another relative to the center of a disc contained in the disc holder. In this way the disc is retained effectively by means of a minimal number of clamping members.

Another preferred embodiment of a disc holder is characterized in that, viewed in radial cross-section, the clamping members comprise walls which are V-shaped relative to the center of a clamped-in disc. The V-shaped walls provide a correct and smooth positioning of the disc in the disc holder. This ensures that the disc is in contact with the clamping members at its circumference only, thereby precluding damaging of the information area of the disc surface. In this respect a preferred embodiment of the invention is characterized in that each clamping member comprises walls which are arranged in the same way as those of a yo-yo. Such yo-yo-shaped clamping members have the advantage that the disc is in contact with the clamping members over a very small part of its circumference.

In another embodiment the two clamping members are each arranged on an associated structural member, which structural members are coupled so as to be movable relative to each other. In this way a disc holder of simple construction is obtained by means of two members.

An effective preferred embodiment of the invention is characterized in that the two structural members are identical. This has the advantage that the disc holder can be manufactured by means of only one die, so that cheap mass production is possible.

An embodiment of the invention, which ensures that a disc contained in the disc holder is always correctly retained by the clamping members has resilient means which urge the clamping members towards each other.

BRIEF DESCRIPTION OF THE DRAWING

FIG. 10 is a plan view of the disc holder used in the loading device shown in FIGS. 8 and 9;

FIG. 11 is a sectional view taken on the lines XI—XI in FIG. 10;

FIG. 12 is a side view taken along the arrow XII in FIG. 10;

DETAILED DESCRIPTION OF THE PREFERRED EMBODIMENTS

Figure 1:
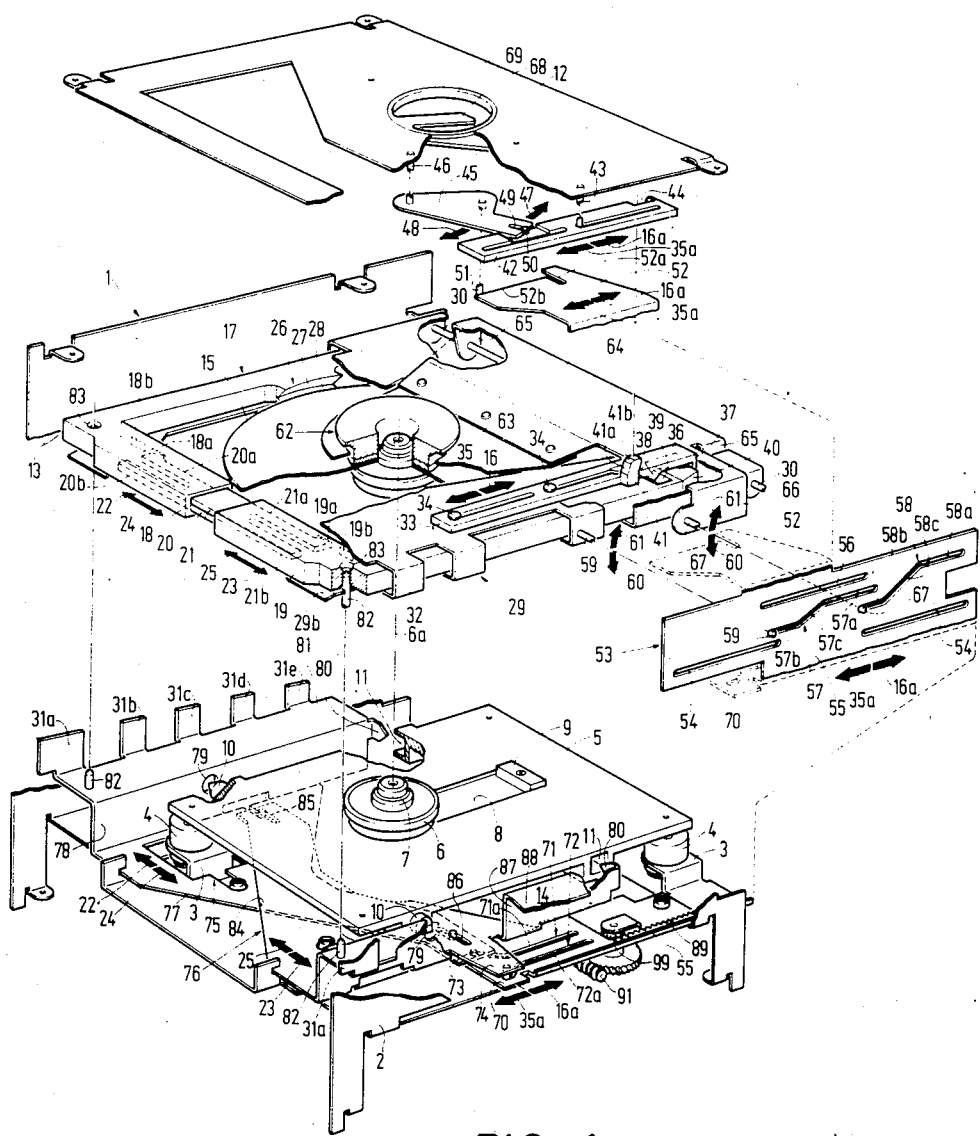
FIG. 1 is an exploded view of a loading device with a disc holder in accordance with the invention and the associated disc-record player.

The disc-record player shown in a playing position in FIG. 1 comprises a housing 1, of which only part is shown for the sake of clarity. Inside the housing four brackets 3 are secured to the frame 2 and each carry an elastic buffer 4. In the present embodiment the buffers 4 are made of rubber. A subframe 5 is supported elastically on the frame 2 by the buffers 4. The subframe 5 carries a turntable 6 which is rotatable about an axis of rotation 6a and which is provided with a centering cone 7 on the upper side. Further, the subframe 5 has a slot 8 in which a read means 9 is movable in a radial direction relative to the turntable 6. The read means 9 is an optical read head which is intended for scanning optically readable discs, which are of the "Compact Disc" type in the present example. On two opposite sides the subframe 5 is provided with pins 10, which are partly cylindrical and whose free end portions are conical. Moreover, the subframe 5 has openings 11 on opposite sides, which openings are preferably rectangular. It is to be noted that the buffers 4 support the subframe 5 in such a way that the center of gravity of the subframe with the parts arranged on it at least substantially coincides with the center of the spring system formed by the elastic buffers 4 (the so-called "center of compliance"). Depending on the position of the subframe the buffers 4 may occupy a different position relative to the subframe. This is possible by adapting the brackets 3. For example, instead of the horizontal position shown, the subframe may occupy a vertical position.

On the upper side the housing 1 is covered by a cover 12, and at the front the housing has a front opening 13. Parts of the housing also form part of the frame 2. The frame carries a loading device 14 which is intended for loading and unloading a disc 15, which loading device comprises a disc holder 17 which can be slid into and out of the housing through the front opening 13 in directions indicated by the arrows 16 and 35 respectively. The disc holder 17 comprises two L-shaped structural members 18 and 19 which are arranged mirror-symmetrically relative to each other. The short limb of each member has a hollow space in which a sliding plate 21 or 20 is fitted. Each sliding plate projects from the hollow space in the associated short limb, lies against the other sliding plate, and extends into the hollow space of the opposite short limb so as to be slidable therein. This sliding movement is indicated by the arrows 22 to 25 in FIG. 1. Near the free ends the sliding plates 20 and 21 each comprise two limbs 20a, 20b and 21a, 21b, respectively, arranged as bifurcations. The limbs 20a and 21a have lateral clamping projections which in conjunction with the openings 18b and 19b, respectively, constitute clamping means which clamp the disc holder 17 in position after the two structural members 18 and 19 have been moved towards each other in the directions indicated by the arrows 24 and 25 respectively. Openings 18a and 19a act as stops to preclude a further extension when the two members 18, 19 are moved away from each other in the directions indicated by the arrows 22 and 23 respectively. The long limbs of the members 18 and 19 are each provided with a clamping portion 26, FIG. 1 showing only the clamping portion 26 on the member 18. The clamping portions 26 have a partly circular shape to enable the disc 15 to be clamped between the two clamping portions 26 after the members 18 and 19 have been moved towards each other. For this purpose the clamping portions 26 are provided with two inclined walls 27 and 28, which in a radial cross-section diverge towards the center of a disc 15. Thus, a disc 15 is always centered correctly in the disc holder 17 after the two members 18 and 19 have been moved towards each other and have been clamped in position relative to each other. However, as described hereinafter the loading device in accordance with the invention may be used in conjunction with different types of disc holders provided with clamping means.

Figures 2, 3:
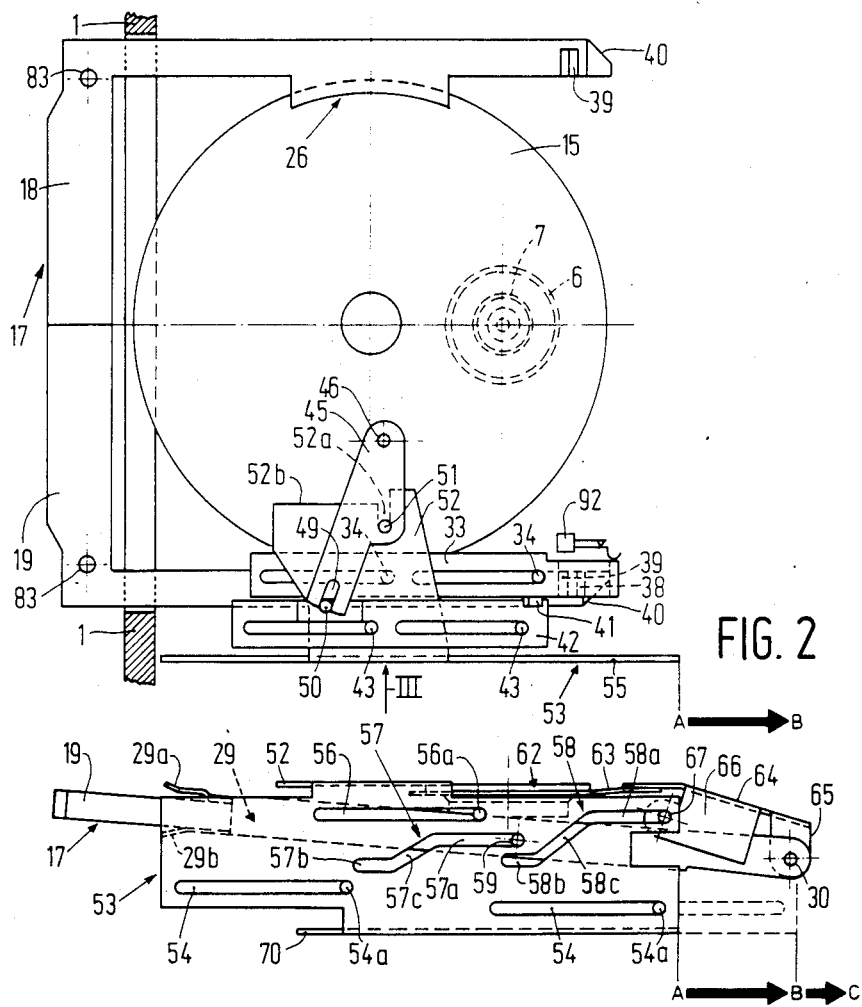
FIG. 2 is a diagrammatic plan view of the loading device shown in FIG. 1, the disc holder being in a position which is occupied after it has been inserted manually into the housing.
FIG. 3 is a side view of the loading device taken along the arrow III in FIG. 2.
Figure 4:
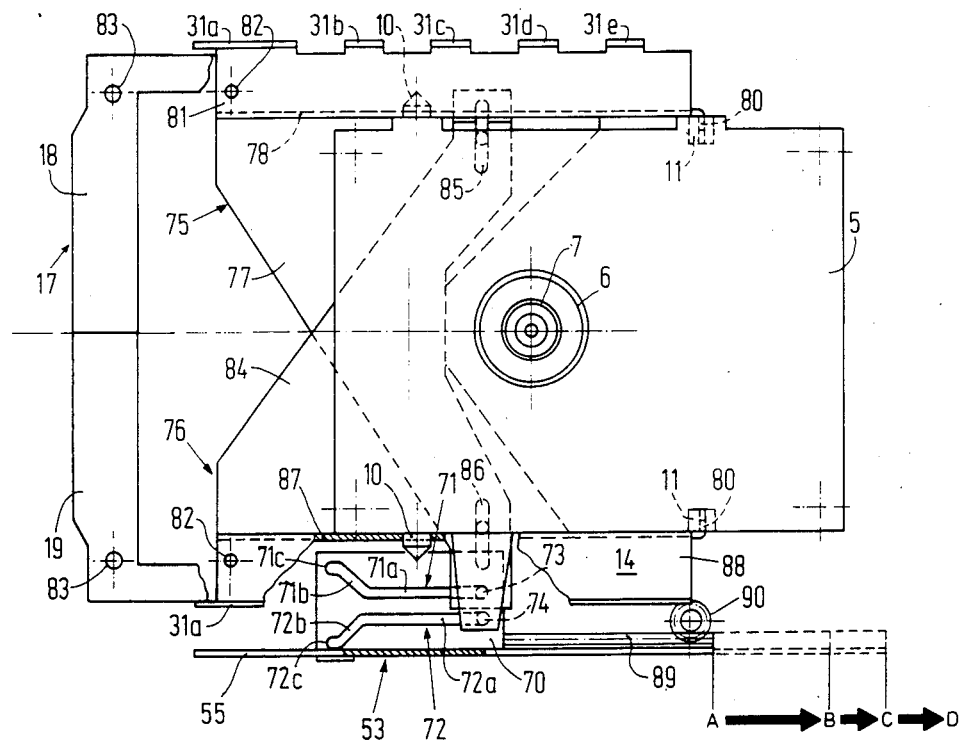
FIG. 4 is a plan view of the loading device in the same position as in FIGS. 2 and 3, the upper parts of the loading device not being shown.

The disc holder 17 is inserted into a transfer means 29 through the front opening 13 in the direction indicated by the arrow 16, which transfer means is pivotally connected to the frame 2 by means of a spindle 30 which is remote from the front opening. In the position occupied by the loading device when loading begins, which position is reached after the disc holder 17 has been inserted manually into the transfer means 29 and which is shown in FIGS. 2, 3 and 4, the transfer means 29 is in a swung-up position (see FIG. 3). The clearance of the disc holder 17 in the transfer means 29 in the direction indicated by the arrows 22 and 23 is such as to allow the movement of the members 18 and 19. Upright tabs 31a to 31e, whose height increases towards the front opening 13 from the tab 31e to the tab 31a, provide lateral guidance during insertion of the disc holder. The tabs 31 project through openings near the side walls 32 of the transfer means 29 in such a way that also near the front opening 13 a satisfactory lateral guidance for the disc holder 17 is obtained in the swung-up position of the transfer means. A first actuating slide 33 is arranged on the upper side of the transfer means 29 and is guided rectilinearly on the transfer means 29 by means of pins 34 in the direction indicated by the arrow 16 and in an opposite direction indicated by the arrow 35. Near the end which is remote from the front opening 13, the first actuating slide 33 is provided with a clamping member 36 which comprises a hook 37 and a projection 38. After manual insertion of the disc holder 17 the projection 38 snaps into a recess 39 near the end of the long limb of the member 19. To simplify manufacture the long limb of the member 18 also has a recess 39. To facilitate insertion both the recess 39 and the projection 38 are of the V-shaped cross-section; and the free ends of the long limbs of the members 18 and 19 are provided with bevelled edges 40, which converge towards each other in the direction indicated by the arrow 16. In the inserted position the hook 37 of the member 36 is positioned around the free end of the long limb of the member 19. Thus, after insertion of the disc holder 17 a correct coupling is obtained between the first actuating slide 33 and the disc holder 17 both in the direction indicated by the arrow 16 and in the direction indicated by the arrow 35. The first actuating slide 33 is provided with a projection 41 which extends towards the cover 12 and which has inclined wall portions 41a and 41b at the side which faces the front opening 30. By means of the projection 41, the first actuating slide 33 is coupled to a second actuating slide 42. The second actuating slide 42 is guided rectilinearly on the lower surface of the cover 12 in directions indicated by the arrows 16a and 35a. The rectilinear guidance of the actuating slide 42 on the cover 12 is provided by pins 43. The first actuating slide 33 and the second actuating slide 42 are coupled to each other by engagement of the projection 41 with the walls of a recess 44 in the second actuating slide 42. The cover 12 further carries a stroke-extension lever 45 which is pivotally connected to the cover 12 by means of a spindle 46. The lever 45 can be pivoted in a direction indicated by the arrow 47 or 48. On its free end the lever 48 is provided with a slot 49 which engages a pin 50 arranged on the upper side of the second actuating slide 42. Further, the levers carries a downwardly projecting pin 51 which is disposed substantially halfway between the spindle 46 and the pin 50 and in the initial position shown in FIG. 2 engages a slot 52a in a first control limb 52. The control limb 52 forms part of a servo member 53, which constitutes a servo means of the loading device 40. The first control limb 52 of the servo member 53 extends substantially parallel to the cover 12 and is situated between the actuating slides 33 and 42, which are arranged adjacent each other.

By means of straight guideways 54 in an upright control plate 55 the servo member 53 is guided rectilinearly on the frame 2 in directions indicated by the arrows 16a and 35a. The control plate 55 has a third straight guideway 56 to preclude tilting of the control plate 55. In FIG. 3 the guideways 54 and 56 are engaged by pins 54a and 56a respectively which are connected to the frame 2.

The control plate 55 further has a first control slot 57 and a second control slot 58. The control slot 57 comprises an inclined guideway 57c, which at both ends adjoin straight guideways 57a and 57b respectively which extend parallel to the arrow 16a. In the same way the control slot 58 comprises an inclined guideway 58c and adjoining straight guideways 58a, 58b. The slope of the guideway 58c may be steeper than that of the guideway 57c and the spacing between the straight guideways 58a and 58b may be larger than that between the straight guideways 57a and 57b. The control slot 57 is engaged by a pin 59 which is rigidly connected to that sidewall 32 of the transfer means 29 which adjoins the control plate 55. Thus, the pin 59 is moved in the control slot 57 when the control plate 55 is moved, causing the transfer means 29 to be pivoted about the spindle 30 during passage through the guideway 57c. The pin 59 then moves from the position shown in FIG. 3 to the position shown in FIG. 6, resulting in a pivotal movement in the direction indicated by the arrow 60 and, during the return movement, a pivotal movement in the direction indicated by the arrow 61 in FIG. 1.

A disc pressure member 62, which is mounted in a blade spring 63, is also pivotable about the spindle 30. The blade spring 63 is secured to a plate 64 which is constructed as a pivotal arm. It is to be noted that the blade spring 63 has been used to minimize the height of the housing 1. If this height is not limited the plate 64 may be extended, in a manner not shown, towards the rear, to carry the disc-pressure means directly. The plate 64 comprises side portions 65, with which it is pivotally mounted on the spindle 30 and a perpendicularly bent side wall 66 on which a pin 67 is mounted. The pin 67 extends into the control slot 58 and during the movement of the control plate 55 it moves from the straight guideway 58a via the inclined guideway 58c through the straight guideway 58b. During passage through the control slot 58 the plate is pivoted about the spindle 30 in a direction indicated by the arrows 60 and 61 respectively. In the position shown in FIGS. 2 and 3 the upper side of the disc pressure member 62 abuts with a resilient tongue 68 which is secured to the cover 12 and which is situated in a circular opening 69 in the cover 12. When it is not loaded the tongue 68 extends slightly downwards. During the movement towards the upper position of the disc pressure member 62 the blade spring 63 is curved, so that the tongue 68 deflects upwards, which ensures that the disc pressure member which has some circumferential clearance relative to the blade spring 63, cannot move upwards too far. This construction is of special importance if the record player is arranged in a vertical position. In this position the tongue 68 prevents the disc-pressure means 62 from dropping out of the blade spring 63, and during passage through the guideway 58c towards the turntable the tongue 68 ensures that the disc pressure means correctly follows the blade spring 63. The position of the guideway 58c at a shorter distance from the spindle 30 than the guideway 57c, as the case may be in conjunction with a steeper slope of the guideway 58c in comparison with that of the guideway 57c, results in the pivotal movement of the disc pressure means 62 about the spindle 30 being performed more rapidly than the movement of the transfer means 29 about the spindle 30. The consequences of this will be explained in more detail under the section titled "Operation".

In a cross-section perpendicular to the arrow 16a the servo member 53 is U-shaped, the limbs of the U being formed by a first control limb 52 and by a second control limb 70 which extends from the control plate 55 opposite the control limb 52 on that side of the transfer means 29. The control plate 55 is situated adjacent the transfer means. The second control limb 70 has two control slots 71 and 72 comprising straight guideways 71a and 72a, respectively, which extend parallel to the arrow 16a. The straight guideways 71a, 72a adjoin guideways 71b, 72b which diverge in the direction indicated by the arrow 35a and which adjoin comparatively short straight guideways 71c, 72c. The control slots 71 and 72 are engaged by pins 73 and 74, respectively, which are situated on plate-shaped sliding elements 75 and 76, respectively. The sliding element 75 comprises a sliding plate 77 which extends from the pin 73 to that side of the subframe 5 which is remote from the control plate 55. At this location adjacent the subframe 5, the sliding plate 77 adjoins a perpendicularly turned-up wall 78 of the sliding element 75 in which an opening 79 which is engageable by the pin 10 on the subframe 5. Further, the side wall 78 comprises a projection 80 with a pointed end-portion which constitutes a latch which is engageable in the opening 11 in the subframe 5. The opposed sides of the subframe 5 are latched by the openings 79 in conjunction with the projection 80 on the side wall 78. A horizontal wall 81 of the sliding element 75 adjoins the upright wall 78 and carries a pin 82 on its upper surface, which pin is situated at a comparatively short distance from the front opening 13. In a manner to be described hereinafter the pin 82 is engageable in coupling means in the form of an opening or bore 83 in the structural member 18. The bore 83 is situated near the junction of the two limbs of the L-shaped member 18. The sliding element 76 comprises a sliding plate 84 which extends at least partly over the sliding plate 77 and extends from the pin 74 towards that side of the subframe 5 which is remote from the control plate 55. Preferably the two sliding plates 77 and 84 are slidable on each other in the area where they overlap, a correct guidance during the movements in the directions indicated by the arrows 22, 23 and 24, 25, respectively being obtained by means of pin-slot connections 85 and 86 which are situated on opposite sides of the subframe 5. The sliding plate 84 adjoins an upright wall 87 of the sliding element 76, which upright wall adjoins a horizontal wall 88 which, in the same way as the wall 81, carries a plurality of tabs 31. Also on this side of the subframe 5 an opening 79 is formed in the wall 87, and a projection 80 extends from the wall 87 towards the adjacent opening 11 in the subframe. Again this opening 79 and projection 80 constitute latching means for latching the relevant side of the subframe 5. The horizontal wall 88 carries a pin 82 which is engageable in coupling means in the form of an opening or bore 83 in the member 19.

For moving the servo member 53 in the direction indicated by the arrow 16a or 35a the second control limb 70 is provided with gear-rack teeth 89 which cooperate with a gear wheel 90 which can be driven by a drive motor, not shown, by means of worm gear 91.

Operation

A disc record 15, which in the present example is of the "Compact-Disc" type, is inserted in the disc holder 17. This may be effected by inserting the disc from the open side of the disc holder between the clamping members 26, which is possible because the structural members 18 and 19 with the long limbs are slightly elastic. Another possibility is to pull the two members 18 and 19 away from each other in the directions indicated by the arrows 22 and 23 and moving them back as indicated by the arrows 24, 25 after a disc has been inserted. The disc is now firmly retained in the disc holder 17, the short limbs of the members 18 and 19 being constructed so that they can also be used as a handle. It is to be noted that the sliding plates 20 and 21 with the limbs 20a, 20b and 21a, 21b respectively and the lateral clamping projections are of great advantage in sliding the members 18 and 19 into and out of each other. The sliding plates 20, 21 ensure that the extension of the members is limited and the two members firmly kept in place to retain a disc 15. In this respect it is to be noted that the members 18 and 19 are preferably identical. This has the advantage that only one die is required for the manufacture of the members. Owing to the construction of the members the disc holder 17 is particularly suitable for mass production.

Subsequently, a disc holder 17, which for example has been taken out of a storage case for a plurality of disc holder, together with the disc 15 it contains is inserted through the front opening 13 into the transfer means 29 in the direction indicated by the arrow 16. Insertion is facilitated by the two outwardly diverging walls 29a and 29b of the transfer means 29 at the top and at the bottom respectively (see FIG. 3). The transfer means 29 then occupies the upwardly inclined pivotal position as shown in FIG. 3. During insertion the tabs 31 provide the lateral guidance of the disc holder. Insertion is facilitated by the tapered ends 40 of the long limbs of the members 18 and 19. The disc holder 17 is inserted as far as is shown in FIGS. 2, 3 and 4.

At the end of the insertion movement, after sliding along the long limb of the member 19, the projection 38 moves downwards into the recessed portion 39 of the member 19. This movement of the projection 38 is possible because the slide 33 can move slightly in a vertical direction relative to the transfer means 29. Thus, the disc holder 17 can be coupled to the servo member 53. At this instant a switch 92 is closed, which switch starts the drive motor, not shown, for the servo member, so that this member is moved in the direction indicated by the arrow 16a. At this instant the various parts of the loading device occupy the positions shown in FIGS. 2, 3 and 4. This means that the short limbs of the members 18 and 19 are still situated wholly outside the housing and the loading device 14 retains the subframe 5 by means of the openings 79 and the projections 10, as well as openings 11 and projections 80. As a result of this, the parts of the loading device and the turntable carried by the sub-frame are positioned accurately relative to each other.

Figure 5:
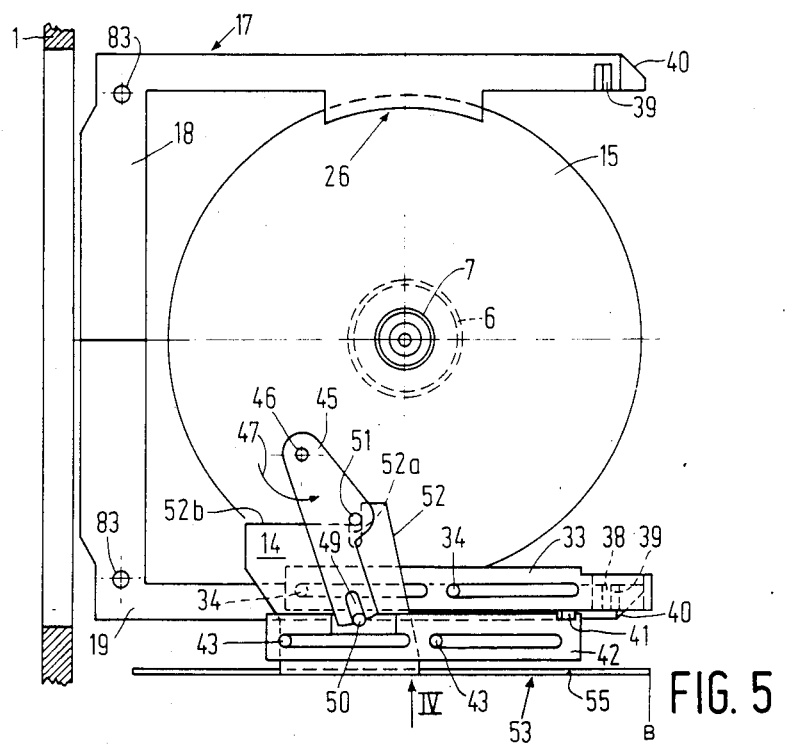
FIG. 5 is a plan view of the loading device after the disc holder has been wholly inserted into the transfer means.

Once the drive mechanism has been started the servo member will move in the direction indicated by the arrow 16a from position A indicated in FIGS. 2, 3 and 4 to position B. This displacement of the servo member 53 results in a first control element constituted by the wall of a slot 52a in the disc-holder control limb 52 driving the pin 51 so that the stroke-extension lever 45 performs a pivotal movement about the spindle 46 in the direction indicated by the arrow 47 (FIG. 5). As a result of this movement of the lever 45 the pin 50 on the second actuating slide 42 performs a stroke which is equal to substantially twice the stroke of the servo member 53. In the present embodiment the distance between positions A and B of the servo member is approximately 14 mm, whilst the actuating slide 42 is moved approximately 30 mm in the direction indicated by the arrow 16. Through the coupling by the projection 41, the second slide 42 drives the first slide 33. After a specific travel of the slides 33 and 42, the slide 33 can no longer move in the height direction relative to the transfer means 29, so that the disc holder 17 is rigidly coupled to the loading device 14 by the projection 38 and cannot be withdrawn by hand. Thus, in both slides 42 and 33, the pins 43 and 34 are moved towards the other ends of the straight guide slots. The servo member 53 has now moved so far that the pin 51 is moved out of the slot 52a, which also stops the movements of the two slides 42 and 33. During this movement the disc holder 17 is slid wholly into the transfer means 29 owing to the coupling of the disc holder 17 by the projection 38, and the short limbs of the members 18 and 19 of the disc holder are now situated inside the housing 1 as shown in FIG. 5.

Figure 6:
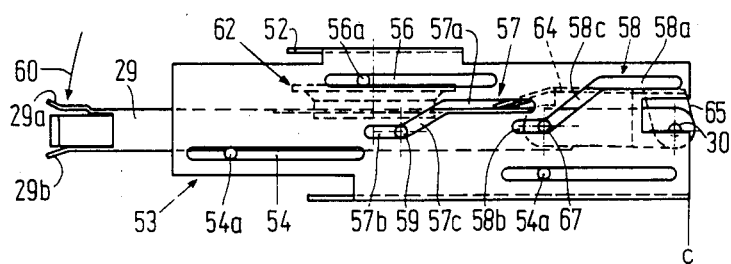
FIG. 6 is a side view of the loading device taken along the arrow VI in FIG. 5, the transfer means being in a lowered position relative to the turntable.

Simultaneously with the movement of the slides 42 and 33, the pins 59 and 67 have begun to move through the guideways 57a and 58a respectively owing to the displacement of the servo member 53. In the position shown in FIG. 5 the center hole of the disc 15 is coaxial with the axis of rotation 6a of the turntable 6. As the servo member 53 moves further in the direction indicated by the arrow 16a towards the position designated C in FIG. 6, the pins 59 and 57 will move through the downwardly inclined guideways 57c and 58c, respectively. The guideway 57c constitutes a transfer-means control element of the servo member 53, which control element now guides the transfer means 29 containing the disc holder 17 towards the turntable 6 in a downward direction as indicated by the arrow 60. A pressure-member control element formed by the guideway 58c guides the disc-pressure member 62 towards the turntable 6 during this stage of the movement. The movement of the disc pressure member 62 proceeds more rapidly than the movement of the transfer means 29 so that the member 62 catches up with the transfer means 29 in order to enable the disc to be urged against the turntable after the disc 15 has been lowered onto the turntable 7, as is shown in FIG. 6. Position C of the servo member 53 as shown in FIG. 6 is reached from position B in FIG. 5 after a travel of approximately 8 mm in the present embodiment. After the disc 15 has been lowered, the disc pressure member is magnetically coupled to the turntable, enabling the disc pressure member 62 to rotate freely with the turntable owing to the circumferential clearance relative to the blade spring 63.

The displacement of the servo member 53 between positions C and D is approximately 18 mm, so that the total displacement of the servo member from position A to position D is approximately 40 mm. As already stated, during the movement of the servo member 53 between position B and position C the pin 51 has become disengaged from the slot 52a and, as can be seen in FIG. 1, has subsequently moved along an edge portion 52b. Consequently, after position B has been reached, the disc-holder control element formed by the slot 52a has become inoperative so that the slides 42 and 33 are not moved any further. During the downward pivotal movement in the direction indicated by the arrow 60 (FIG. 6) the first slide 33 is also pivoted, which pivotal movement is possible owing to the presence of the inclined portions 41a and 41b of the projection 41.

Figure 7:
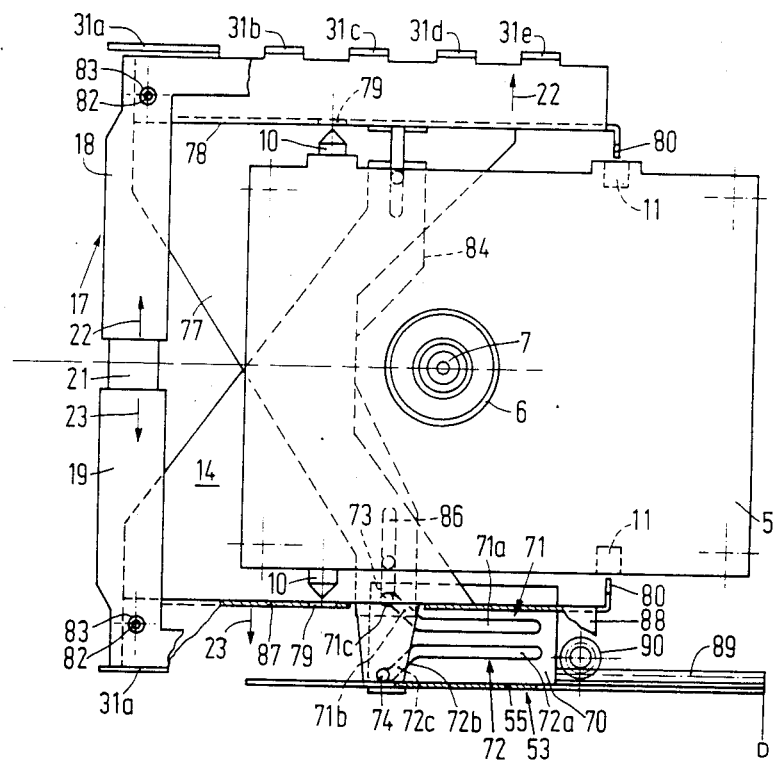
FIG. 7 is a plan view of the loading device, in which a number of upper parts are not shown and in which the loading device is in the position in which the servo means is at the end of its travel.

During the preceding stage of the movement to position C the pins 73 and 74 have followed the corresponding parallel guideways 71a and 72a. From position C the pins now travel through the diverging guideways 71b and 72b; first portions of the guideways 71b and 72b constitute a clamping-member control element which during this stage of the movement of the servo member 53 cause the sliding elements 75 and 76 move in opposite directions as indicated by the arrows 22 and 23 respectively. When the transfer means 29 is lowered, the pins 82 on the sliding elements 75 and 76 engage bores 83, so that the structural members 18 and 19 are moved away from each other as the sliding elements are moved away from each other. As a result, the clamping portions 26 of the members are also moved apart, so that the disc 15 is released from the disc holder 17. Therefore, the disc is released during the first stage of the movement of the pins 73 and 74 in the diverging guideways 71b and 72b respectively. The movement of the sliding elements 75 and 76 away from each other also results in the openings 79 and the projections 10 moving away from each other, but during the first stage of the movement of the sliding elements 75 and 76 away from each other, the openings 79 and the projections 10 still retain the subframe 5. This is because the lengths of the cylindrical portions of the pins 10 is greater than the distance over which the sliding elements have travelled, which distance is for example 2.5 mm. During the subsequent second stage of the movement of the sliding elements away from each other, for example to a distance of 3.5 mm, second portions of the diverging guideways 71b and 72b constitute a latch control element, which ensures that the subframe 5 is now unlatched. The servo member is now in position D in FIG. 7, in which position the subframe 5 is uncoupled from the loading device 14. After the pins 73 and 74 have been positioned in the short straight guides 71c and 72c respectively, the drive motor of the servo member 53 is stopped. Now the disc may be played without the risk of shocks to which the housing 1 is subjected being transmitted to the subframe 5 carrying the turntable 7 and the read means 9 via the loading device.

If the user wishes to remove the disc from the disc-record player, the drive motor is restarted in a direction opposite to that required to drive the servo member 53 in the direction indicated by the arrow 35a by depressing a button, not shown, as a result of which the sliding elements 75 and 76 move towards each other in the directions indicated by the arrows 24 and 25 in FIG. 1, in order to latch the subframe 5 again. After the pins 10 have engaged the openings 79 and the projections 80 have engaged the openings 11, the members 18 and 19 with the clamping portions 26 have moved towards each other so far that the disc can be retained again, the V-shaped walls 27 and 28 ensuring that the disc is positioned correctly in the disc holder 17. Subsequently, the transfer means 29 and the disc pressure member 62 are raised, the disc pressure member again being moved more rapidly to allow an unimpeded removal of the disc holder after the position shown in FIG. 3 has been reached. During the movement of the servo member 53 in the direction indicated by the arrow 35a the movements of the five control elements described in the foregoing are performed in the reverse sequence. By means of the hook 37 the disc holder 17 is slid out of the transfer means 29 in the direction indicated by the arrow 35 at the end of the movement between position B and position A, so that at the end of the movement of the disc holder 17 again projects from the housing 1 with the short limbs of the members 18 and 19. Thus, the user can simply slide the disc holder out of the housing and insert another disc holder with associated disc.

The use of the central servo member 53 results in a compact control mechanism for the loading device in accordance with the invention. In this respect it is advantageous that the control limbs 52 and 70 and the control plate 55 of the servo member are arranged in the form of a U, the control plate 55 being situated adjacent the subframe 5 and the two control limbs extending above and beneath the subframe respectively. This renders the construction of the loading device particularly suitable for use in mobile disc-record players such as those employed in cars. The disc record player with a loading device in accordance with the invention is also suitable for use in portable equipment, in which case the subframe may also be arranged in a vertical position. Further, an important feature of the loading device in accordance with the invention is that the subframe 5 forms a self-contained unit inside the housing. This has the advantage that a standard disc-record player may be employed, requiring only minor modifications. As a result of this, the loading device in accordance with the invention may readily be combined with all types of disc-record players.

It is to be noted that the servo member 53 offers more possibilities than those described in the foregoing. For example, it is possible to use a so-called pause or stand-by position, which may occur for example if the user wishes to briefly interrupt the playing cycle. This may be effected by moving the servo member from position D in FIG. 7 over a short distance until position C shown in FIG. 6 is reached. The drive motor of the servo member can be stopped in this position C by means of a switch, not shown. In this position C the subframe 5 is again latched in position and the disc is retained in the disc holder 17, so that both the subframe 5 and the disc 15 occupy fixed positions inside the housing 1. If the disc record player must be started again the drive is restarted by means of a button, not shown, and the servo member is moved forward in the direction indicated by the arrow 16a, upon which playing may recommence after the disc and the subframe have been released. Another possibility is to start the drive motor of the servo member 53 automatically by means of electronic control circuitry at the instant that the read means has reached the end of the disc, so that the disc holder 17 is automatically moved to position A when the end of the disc is reached.

In order to obtain the various intermediate positions of the servo member 53 a number of slip contacts may be arranged on the control plate 55 in a manner not shown, which contacts scan tracks on a printed circuit board. This enables the various positions of the servo member to be defined in a simple and cheap manner by means of electronic control circuitry.

It is to be noted that instead of the projection 80 and the opening 11, a pin 10 and an opening 79 may be arranged on both sides of the subframe 5 at the same location. Alternatively, the pin 10 may be arranged on the wall 78 and the opening 79 may be formed in the subframe 5.

Figure 8:
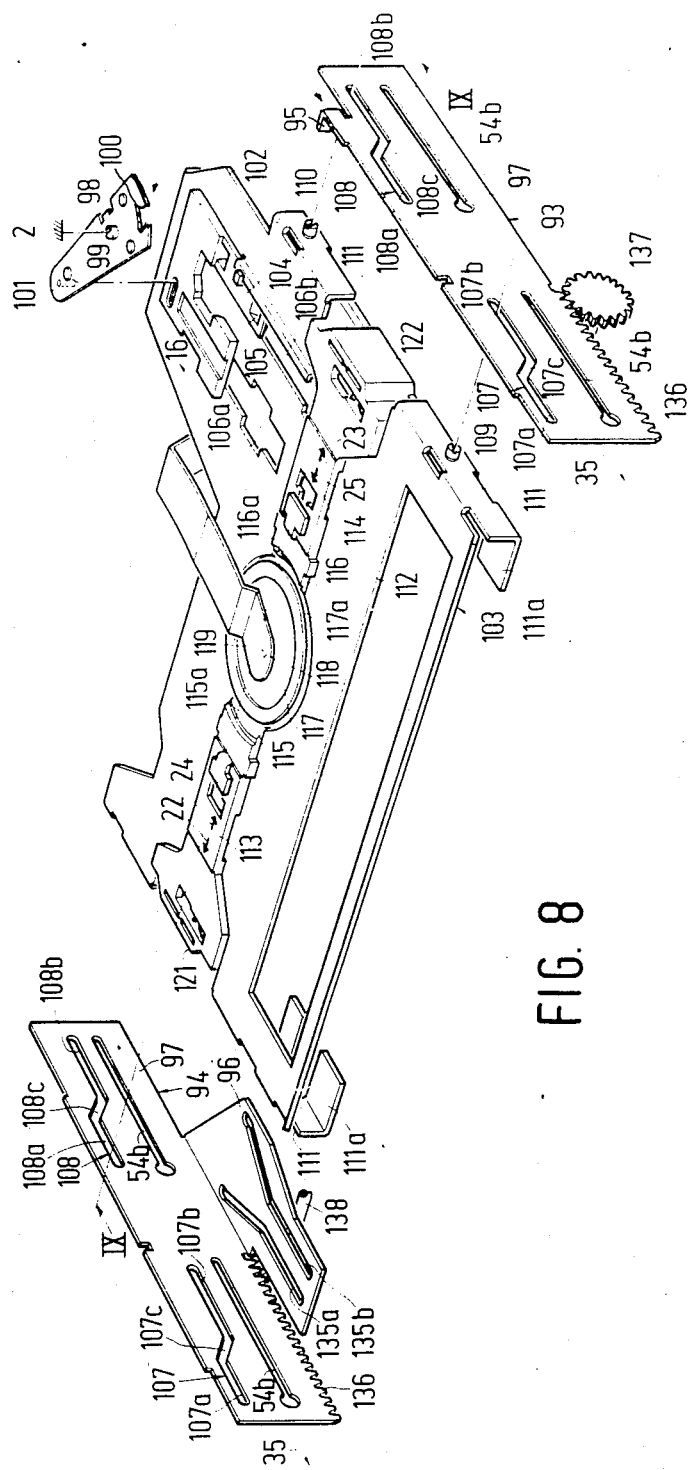
FIG. 8 is an exploded view of a loading device of a second type.
Figure 9:
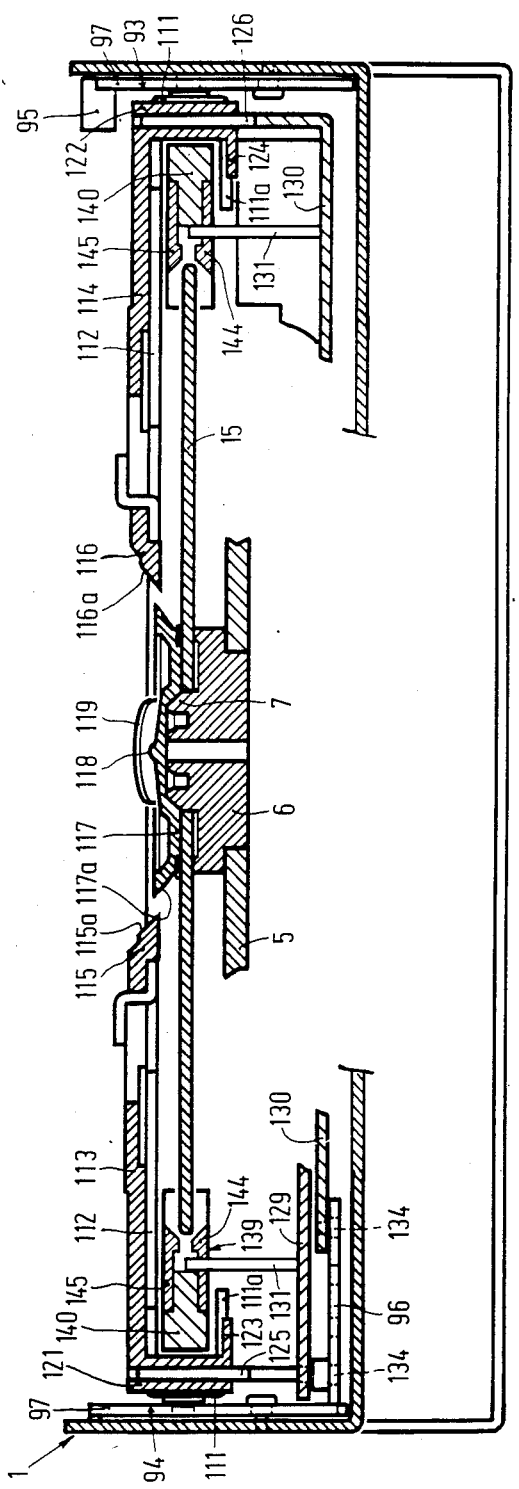
FIG. 9 is a sectional view taken on the lines IX—IX in FIG. 8.

A second embodiment of loading device shown in FIGS. 8 and 9, employs two servo members 93 and 94 which each comprise a control plate 97, a first servo member 93 carrying a perpendicularly bent tab constituting a first control limb 95, the second servo member 94 carrying a second control limb 96. The two control plates 97 are substantially mirror-inverted relative to each other. The first control limb, which constitutes the disc-holder control element of the loading device, can cooperate with a stroke-extension lever 98, which in the same way as the lever 45 is pivotally mounted on the frame 2 by means of a spindle 99 and is provided with an opening 100 which is engaged by the control limb 95 during insertion of the disc holder. On the other side of the spindle 99 the lever 98 carries a pin 101, which engages a hole in an actuating slide 102. The slide 102 comprises two limbs which are slidably guided in the direction indicated by the arrow 16 in slots 106a and 106b on a transfer means 103, the slide 102 extending substantially transversely of the direction indicated by the arrow 16. A clamping member 104 is connected to one of the limbs of the slide 102 so as to be movable in the height direction, which in the same way as the member 36 in the first embodiment is provided with a projection 105. In a manner not shown, the member 104 is provided with a hook at the back, which hook is similar to the hook 37 in the first embodiment.

In the loading device of FIGS. 8 and 9 the control plates 97 on both sides of the transfer means 103 are also provided with straight guideways in the form of two control slots 107 and 108. The control slot 107 comprises two straight guideways 107a, 107b between which a downwardly inclined guideway 107c is situated, whilst the control slot 108 also comprises straight guideways 108a, 108b and a downwardly inclined guideway 108c situated between them. The relevant corresponding portions of the control slots extend at the same levels and in the same directions relative to the cover 12 of the housing 1. The difference with the preceding embodiment is that, viewed in the direction of insertion, the guideways 107c, 108c are downwardly inclined from the front opeing 13, so that the two servo members 93, 94 move in a direction indicated by the arrow 35, opposite to that indicated by the arrow 16, when the disc 15 is moved towards the turntable 6. The control slots 107, 108 are engaged by pins 109, 110 arranged on side walls 111 which at the top adjoin a supporting plate 112 of the transfer means 103 and at the bottom adjoin supporting edges 111a. The slide 102 is slidably guided on the plate 112 in which slots 106a, 106b are formed. Further, two slides 113 and 114 are guided on the plate 112 so as to be slidable in opposite directions as indicated by the arrows 22, 23 or towards each other as indicated by the arrows 24, 25. On the facing ends the slides 113, 114 comprise wedge-shaped lifters 115 and 116 respectively, which lifters are adapted to cooperate with a disc-pressure member 117 which is provided with a conical circumferential edge 117a, whose diameter increases in a direction away from the turntable 6. Thus, as they are moved towards each other as indicated by the arrows 24, 25 the lifters 115, 116 can move the pressure means 117 away from the turntable 6 owing to the presence of the wedge-shaped edge portions 115a, 116a. On its upper side the pressure means 117 is provided with a pivot 118 against which a blade spring 119 acts. The blade spring 119 extends over some distance in the direction indicated by the arrow 16, has a downwardly bent portion near the rear of the transfer means 103 and has an end portion which is secured to the subframe 5 in a manner not shown. In the playing position as shown in FIGS. 8 and 9 the blade spring 119 urges the disc-loading means 117 against a disc so that the disc is in a stable position on the turntable 6.

On both sides of the transfer means 103 the slides 113, 114 are provided with downwardly extending side walls 121, 122 which at the bottom adjoin bottom portions 123, 124 which extend parallel to the plate 112. Vertically slidable coupling members 125, 126 (FIG. 9) are situated in the side walls 121, 122, which members may be compared with the tabs 31c in a preceding embodiment and are arranged on sliding elements 129, 130. The sliding element 130 extends to the left. These sliding elements carry pins 131 similar to the pins 82 in the preceding embodiment. The sliding elements 129, 130 further carry pins 134 near the left ends. The pins 134 engage in control slots 135a and 135b in the second control limb 96. The control slots may be compared with the control slots 71 and 72. In the manner described slides 113, 114, which are intended for controlling the disc-pressure means 117, are controlled by the control slots 135a and 135b, which in the present case diverge relative to each other in the direction indicated by the arrow 16. In this way the pressure-means control element, intended for controlling the disc-pressure means, is formed by the control slots 135.

On their lower surfaces the two servo members 93, 94 are provided with gear-rack teeth 136, which cooperate with the gear wheel 137 mounted on a central spindle 138. Thus, the two servo members are driven by a drive motor of the central drive mechanism via the spindle 138. This ensures that the movements of the two brackets are synchronized correctly.

In the loading device of FIGS. 8 and 9 a disc holder 139 may be employed which is shown in more detail in FIGS. 10 to 12. This disc holder 139 comprises a rectangular frame 140 which in its centre has a circular opening 141. At the front ends this disc holder 138 has chamfered edges 142. On opposite sides of the opening 141 two slides 143 are arranged mirror-symmetrically relative to each other. The slides 143 comprise upper and lower plates 144, 145 which are rigidly connected to each other by means of pins 146 which are guided in slots 147 in the frame 140 in such a way that the slides are guided correctly in a direction perpendicular to that indicated by the arrow 16. Preferably each slide is firmly retained in both end positions, for example by clamping, relative to the frame 140. In the plan view shown in FIG. 10 the slide 143 comprises two clamping members 148 arranged between the pins 146, which members as shown in FIG. 11 comprise clamping walls 148a, 148b which in cross-section are arranged as a V. Preferably, the clamping members 148 are constructed as halves of a so-called yo-yo so that a disc 15 disposed between the clamping members 148 contacts the clamping members over a minimum part of the circumference in the clamped-in position. Other parts of the disc are clear of the disc holder. As a result of the slits in the plates 144, 145 on both sides of each clamping member 148 the clamping members can move slightly in the vertical direction. The pins 146 have hollow central portions for receiving the pins 131 of the loading device after insertion of the disc holder 139, whereby the pins 14b serve as coupling means to move the slides 143 in a lateral direction.

The operation of the loading device of FIGS. 8 and 9 greatly resembles that of the preceding embodiment. By inserting the disc holder 139 of FIG. 10 containing the disc 15, the projections 105 snap into a recessed portion 140 of the disc holder 139. The drive motor, not shown, is now started by a switch, so that the servo members 93, 94 begin to move in the direction indicated by the arrow 35. This results in the lever 98 being pivoted about the spindle 99 clockwise, so that the slide 102 is moved backwards as indicated by the arrow 16 and the disc holder 139 is inserted further. During insertion the pins 110 and 111 109, 110 move through the control slots 107 and 108 respectively. The transfer means 103, which in the present embodiment is in a horizontal position relative to the cover 12 during insertion, moves downwardly towards the turntable 6 owing to the arrangement of the control slots. The control limb 95 then functions as the disc-holder control element of the loading device. During insertion of the disc holder the two slides 113, 114 are in a position in which they have been slid towards each other, so that the disc-pressure member 117 is raised relative to the transfer means 103 against the action of the spring 119 and cannot obstruct the insertion of the disc holder. During insertion the plate 112 with the side walls 111 and the edges 111a provides a correct guidance at the upper side of the disc holder 139. At the same time side walls 121, 122 and the bottom portions 123 and 124 of the slides 113 and 114 guide the disc holder correctly at the sides and the bottom. After the guideways 107c, 108c, which function as the transfer-means control element of the loading device, have moved the transfer means containing the disc holder in a downward direction, the two control slots 135a and 135b cause the sliding elements 129, 130 to move away from each other in the directions indicated by the arrows 22, 23. As the transfer means 103 is lowered the pins 131 further penetrate the openings or bores of the pins 146, thereby coupling the sliding elements 129, 130 to the slides 143 of the disc holder. As the control slots 135a, 135b are traversed the sliding elements move in the same way as with the control slots 71, 72 in the proceeding embodiment, during which three functions are performed. Firstly, the control slots, which function as the pressure-means control element provide the movement of the disc-pressure member 117 towards the turntable 6. This is achieved in that the coupling members 125 have caused the lifters 115, 116 to move apart, so that the blade spring 119 has moved the disc-pressure member 117 in a downward direction and has urged the disc 15 onto the cone 7 on the turntable in the correct position. Second, the pins 131 have moved the two clamping members 148 of each slide 143 away from the disc, so that the disc is now clear of the disc holder. Thus, the control slots 135a, 135b now act as the clamping-member control element of the loading device. Finally, in a manner not shown but similar to that in the first embodiment, latching means on the sliding elements 129, 130 have released the subframe 5. Preferably, these movements are effected consecutively during passage of adjacent portions of the control slots 135a, 135b.

In the manner described the two servo members enable the transfer means 103 to be moved downwardly in a position parallel to the cover 12, so that the disc holder can be inserted parallel to the cover. During insertion the disc holder is guided properly in the transfer means 103. The construction of the disc-pressure member 117 in combination with the present loading device makes it possible to minimize the height of the housing. The height of the disc-pressure member above the transfer means 103 can be minimal; the present arrangement does not require any magnetic action of the disc-pressure member. This may be of advantage so as to avoid the adverse effect which such a magnetic disc-pressure member may have on the read means. The disc holder 139 enables a smooth insertion of the disc 15 by moving the slides 143 apart, the yo-yo-shaped clamping members 148 providing an effective clamping of the disc. In this respect it is of advantage that the disc is retained at a very limited number of locations, to preclude damaging of the disc surface. During removal of the disc from the turntable the clamping members can readily grip the disc 15, the walls 148a, 148b providing a satisfactory centering of the disc in the disc holder. The other movements performed during removal of the disc when the loading device in accordance with the invention is used proceed in a reverse sequence compared with the movements during loading as described in the foregoing.

The loading devices of the preceding type may be used in conjunction with disc holders of a construction which differs from those of the disc holders 17 and 139 described. The various disc holders in accordance with the invention are shown in FIGS. 13 to 19. All these disc holders employ the principle of the loading device described in the foregoing, in which two clamping members situated adjacent the disc relative to the direction of insertion can be moved away from each other transversely of the direction of insertion in order to release the disc.

Figure 13A:
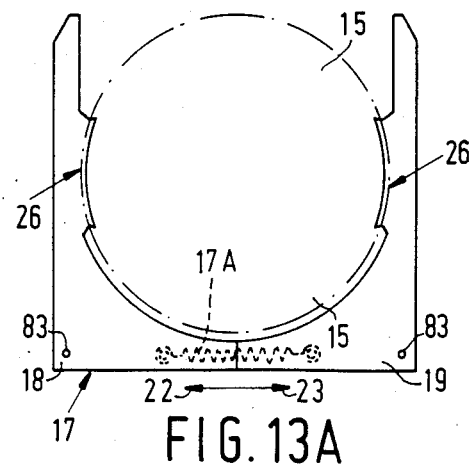
FIGS. 13-19 are plan views of various embodiments of the invention.
Figure 13B:
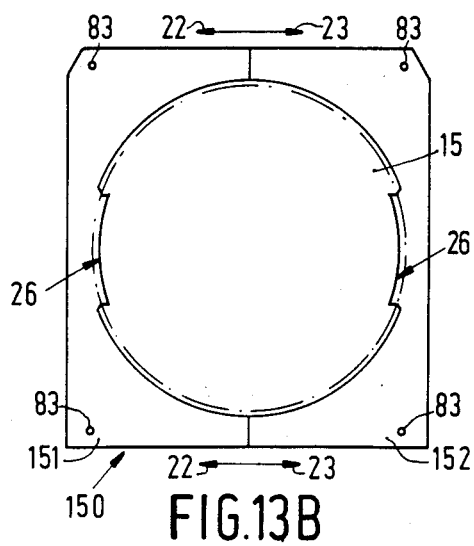

FIG. 13a shows the disc holder 17 of the same construction as shown in FIG. 1. Alternatively, a tension spring 17A may be arranged between the short limbs of the members 18 and 19, which spring urges these members towards each other. Similar spring means may also be used for moving the clamping members towards each other in the embodiments described hereinafter. A variant to FIG. 13a is shown in FIG. 13b, which shows a disc holder 150 which comprises two structural members 151, 152 and which is circumferentially closed for improved disc retention and ease of insertion into the transformer means. In a manner not shown the disc holder 150 is provided with sliding elements near its two transverse sides. To facilitate opening of the disc holder, bores 83 are formed near the four corners.

Figure 14A:
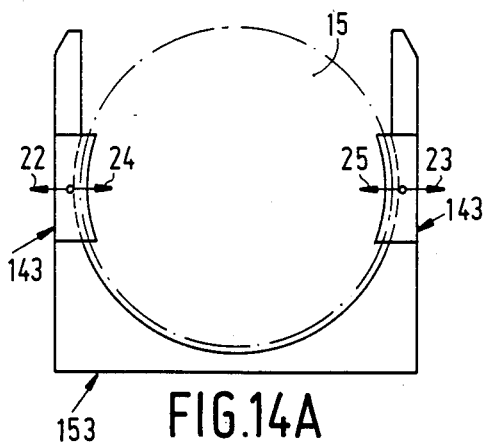
Figure 14B:
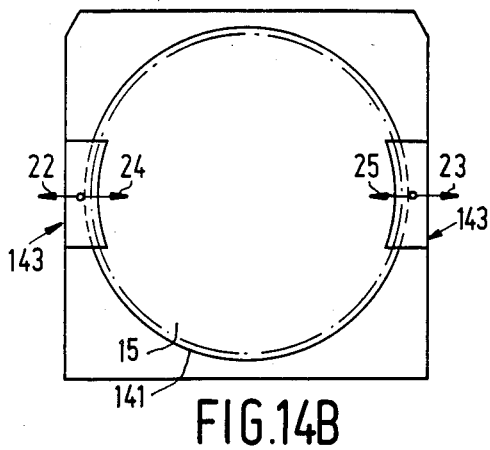

The disc holder 153 shown in FIG. 14a is largely constructed in the same way as the disc holder 139 shown in FIGS. 10, 11 and 12, which disc holder 139 is shown again in FIG. 14b for the sake of clarity. The difference is that the disc holder 153, in the same way as the disc holder 17, is open at one side. The difference from the disc holder 17 is that slides 143 carrying the clamping members are slidable relative to the other parts of the disc holder. This may be advantageous if it is desirable that the clamping members can easily be moved away from the disc without altering the specific shape of the disc holder.

Figure 15A:
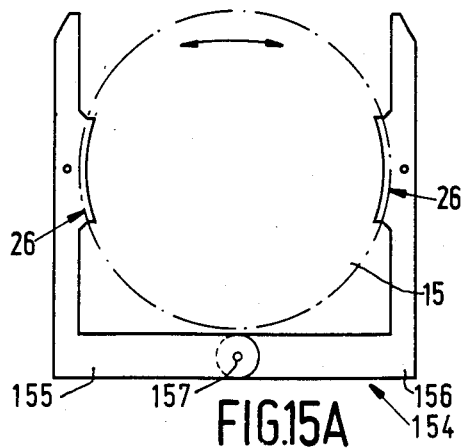
Figure 15B:
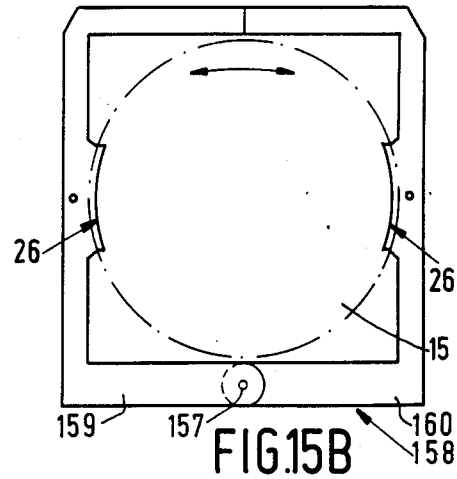

FIG. 15a shows a disc holder 154 which comprises two L-shaped structural members 155, 156 which are pivotally connected to each other by means of a spindle 157. In the same way as shown in FIG. 13a the disc holder 153 is provided with clamping members for the disc 15. Projections may be arranged around the pivotal spindle to position the disc holder 154 in the clamping and in the open position. FIG. 15b shows a combination of the embodiment shown in FIG. 15a and that shown in FIG. 13a. A disc holder 158 comprises two U-shaped structural members 159, 160 which carry laterally movable clamping members 26 which are interconnected at the ends which are remote from the spindle 157 by means of a construction similar to that used in the first embodiment shown in FIGS. 13a and 13b. This results in a combination of a clamping connection and a pivotal connection between the ends of the structural members of the disc holder. Pivoting said members results in a smooth movement, whilst clamping results in a very stable positioning.

Figure 16A:
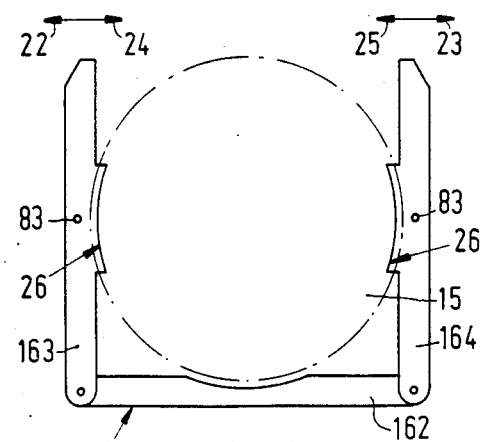
Figure 16B:
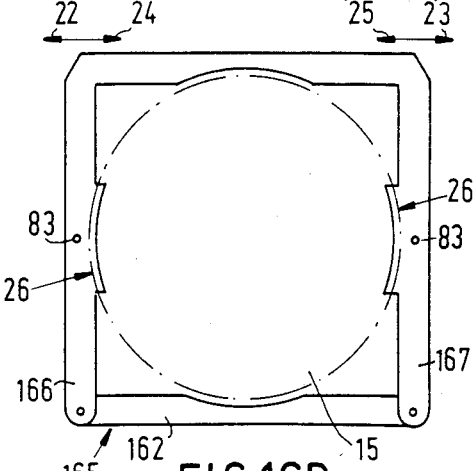

FIG. 16a shows a variant constituted by a disc holder 161 which comprises a fixed transverse member 162 having on respective ends pivotal limbs 163 and 164 which carry the clamping members 26. The advantage of this construction is that the transverse member 162 may serve as a grip which occupies a fixed position, whilst the limbs 163, 164 may readily be pivoted away from the disc. FIG. 16b shows a variant to this embodiment, in which a disc holder 164 comprises a transverse member 162 and two L-shaped members 166, 167 whose short limbs are interconnected by sliding elements in the same way as in the first embodiment 17. This enables a stable positioning. It is to be noted that the sliding elements used for retaining the two members 166, 167 relative to each other may have such a shape that these sliding elements do not obstruct the pivotal movement of the limbs.

Figure 18:
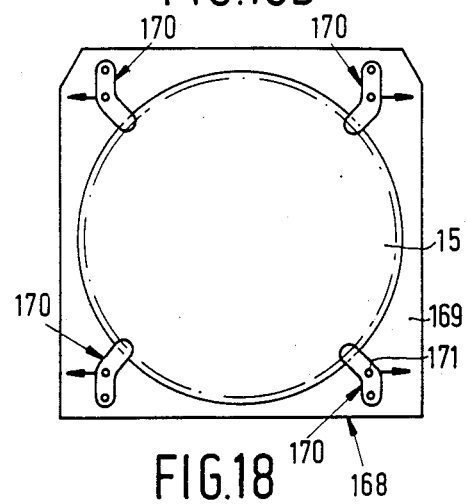

A further disc holder 168 shown in FIG. 18 comprises a frame 169 on which four V-shaped pivotal members 170 are arranged, the members being pivotable about spindles which are situated near the corners of the frame 169. The members have coupling means in the form of openings 171 which are situated at the crotch of each V-shaped member 170, in such a way that in conjunction with a loading device the members 170 can be laterally displaced. The ends of the members 170 which face the disc constitute the clamping members for retaining the disc. In a manner not shown the members are firmly retained in both final positions.

Figure 17:
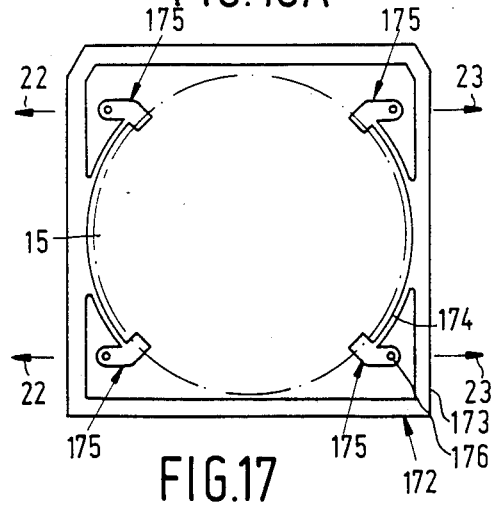

A disc holder 172, shown in FIG. 17, comprises a frame 173 which carries elastic limbs 174 on two opposite sides. Each limb 174 is provided with a clamping member 175 at the end which is remote from the frame 173, which members each have an opening 176. Thus, as in the same way as in the disc holder 168, four clamping members 175 are provided. The disc holder 172 can be manufactured integrally from a plastics material so that the disc holder 172 is particularly suitable for mass manufacture.

Figure 19:
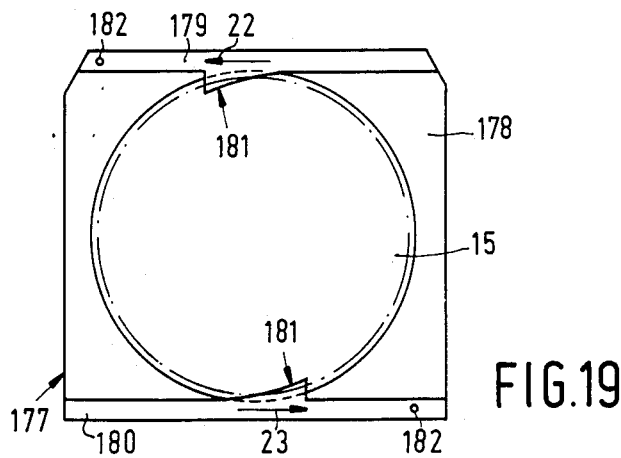

A disc holder 177, shown in FIG. 19, comprises a frame 178 on which two sliding elements 179 and 180 are arranged in such a way that they can be moved in opposite directions to release the disc 15. Sliding movements of the sliding elements are directed perpendicularly to the direction of insertion of the disc holder into the transfer means and can be obtained easily by utilizing the oppositely directed movements of the sliding elements 75, 76 and 129, 130 of the loading device of the first and of the second type respectively. For retaining the disc clamping members 181 are arranged on the sliding elements, which members in the same way as the clamping member 26 are provided with walls which are arranged as a V and which are concentric with the disc through a limited arc of circle only. As a result of this a small sliding movement results in the clamping members 181 being moved from the disc far enough to permit the disc to be moved freely. For shifting the sliding elements they are formed with openings 182 near two diagonally opposite corners of the disc holder 107.

All these embodiments comprise at least two clamping members as described, which are situated near two opposite sides of the disc holder, and which are each connected to at least one coupling means comprising an opening which is engageable by a pin of the loading device. The coupling means are movable away from each other by moving the pins of the loading device away from each other to release the disc from the disc holder. For retaining the disc in the disc holder these movements are effected in opposite directions. The disc holders described in the foregoing are all suitable for insertion into a storage case which can accommodate a plurality of holders. The clamping members of the disc holders described in the foregoing have the advantage that they can be operated easily to release the disc or to retain the disc, whilst the diametral arrangement of the clamping members relative to the center of a disc ensures that the disc is retained effectively.

What is claimed is:

1. A disc holder for a rigid audio and/or video disc, which holder is intended for transferring the disc to the turntable of a disc-record player by means of a loading device and which comprises clamping means for retaining the disc in the disc holder, characterized in that the clamping means comprises two clamping members which are situated near respective opposite sides of the disc holder and which are each fixed relative to a respective coupling means which can be coupled to the loading device, which coupling means and clamping members are both moved away from the disc and each other to release the disc from the disc holder and towards each other and to retain the disc in said holder in response to like movements of the loading device.

2. A disc holder as claimed in claim 1, characterized in that the two clamping members are situated diametrally opposite each other relative to the center of a disc contained in the disc holder.

3. A disc holder as claimed in claim 1, characterized in that viewed in radial cross-section the clamping members comprise walls which are V-shaped relative to the center of a clamped-in disc.

4. A disc holder as claimed in claim 3, characterized in that each clamping member comprises walls which are arranged in the same way as those of a yo-yo.

5. A disc holder as claimed in claim 1 characterized in that the coupling means for each clamping member comprises an opening for coupling to the loading device, said loading device comprising a pair of pins movable toward and way from each other, each opening being engageable by a respective pin of the loading device in a direction perpendicular to the major surface of the disc holder.

6. A disc holder as claimed in claim 1, characterized in that the disc holder comprises a pair of structural members coupled to be movable relative to each other, the two clamping members each being arranged on an associated structural member.

7. A disc holder as claimed in claim 6, characterized in that the two structural members each comprise a projecting sliding element, each sliding element on the relevant structural member engaging a recess in the other structural member to interconnect said members.

8. A disc holder as claimed in claim 6, characterized in that the two structural members are identical.

9. A disc holder as claimed in claim 6, characterized in that the structural members are each L-shaped, the short limbs being interconnected by the sliding elements so as to be movable relative to each other and the long limbs carrying the clamping members.

10. A disc holder as claimed in claim 6, characterized in that the structural members are interconnected by means of sliding elements on two facing sides.

11. A disc holder as claimed in claim 6, characterized in that the structural members are pivotally connected to each other.

12. A disc holder as claimed in claim 11, characterized in that the structural members are connected by a pivotal connection on a first side and by sliding elements on a second opposite side.

13. A disc holder as claimed in claim 6, characterized in that the structural members are pivotally mounted on a fixed transverse member of the disc holder.

14. A disc holder as claimed in claim 2, characterized in that the clamping members are arranged on two slides, which slides are slidably arranged near two opposite sides of a fixed frame of the disc holder.

15. A disc holder as claimed in claim 14, characterized in that each slide comprises two interconnected plates situated on opposite sides of the frame, the edge portions of the plates constituting the clamping members.

16. A disc holder as claimed in claim 6, characterized in that the structural members are pivotally connected to a stationary frame of the disc holder.

17. A disc holder as claimed in claim 16, characterized in that in a plan view of the disc holder the structural members are V-shaped and are pivotally connected to the frame near their ends.

18. A disc holder as claimed in claim 17, characterized in that the opening of the coupling element of each clamping member is situated at the crotch of the V-shaped member.

19. A disc holder as claimed in claim 16, characterized in that the structural members are connected to the frame by elastic limbs and the disc holder is integral with the structural members.

20. A disc holder as claimed in claim 6, characterized in that the structural members extend parallel to each other and are guided on a stationary frame so as to be slidable parallel to each other in opposite directions.

21. A disc holder as claimed in claim 1, characterized in that there are provided resilient means which urge the clamping members towards each other.

22. A disc holder for a rigid audio and/or video disc, which holder is intended for transferring the disc out of the holder to the turntable of a disc-record player by means of a loading device of said player, said disc holder comprising:
   retaining means for retaining the disc in the disc holder, said retaining means comprising two clamping members which are situated near two opposite sides of the disc holder;
   coupling means which can be coupled to the loading device of said player for moving the clamping members relatively away from each other to release the disc during actuation of said loading device; and
   spring means for moving said clamping members relatively toward each other to retain the disc in the disc holder when actuation by said loading device ceases.

* * * * *